United States Patent [19]

Hays

[11] 3,918,787

[45] Nov. 11, 1975

[54] BATTERY TERMINAL DEVICE
[75] Inventor: Kenneth Scott Hays, Exton, Pa.
[73] Assignee: AMP Incorporated, Harrisburg, Pa.
[22] Filed: June 25, 1974
[21] Appl. No.: 482,701

[52] U.S. Cl................ 339/19; 339/95 B; 339/222; 339/224
[51] Int. Cl.² ....................................... H01R 31/08
[58] Field of Search ...................... 339/95 B, 97–99, 339/19, 222, 224–240

[56] References Cited
UNITED STATES PATENTS
3,529,280    9/1970    Best ................................ 339/226 R
3,694,794    9/1972    Hein ................................ 339/224

FOREIGN PATENTS OR APPLICATIONS
1,198,797    7/1970    United Kingdom............... 339/97 R Primary Examiner—Joseph H. McGlynn
Attorney, Agent, or Firm—William J. Keating; Jay L. Seitchik; Frederick W. Raring

[57] ABSTRACT

A device which may be used to temporarily complete a circuit between a battery post and a battery terminal wire connected thereto while bypassing the juncture of the battery terminal and battery post and the juncture of the battery wire and the battery terminal.

5 Claims, 5 Drawing Figures

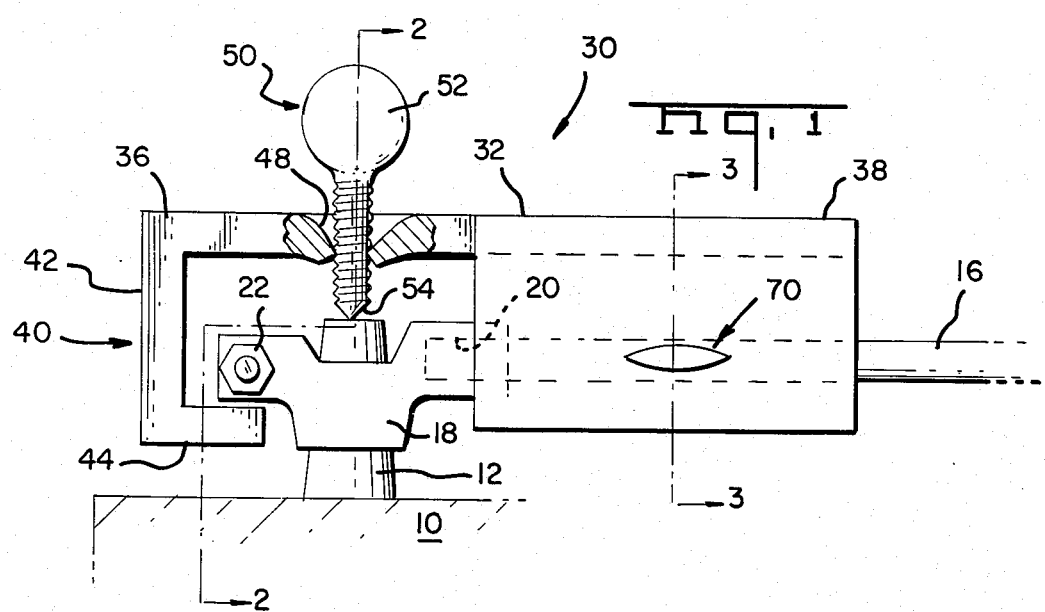
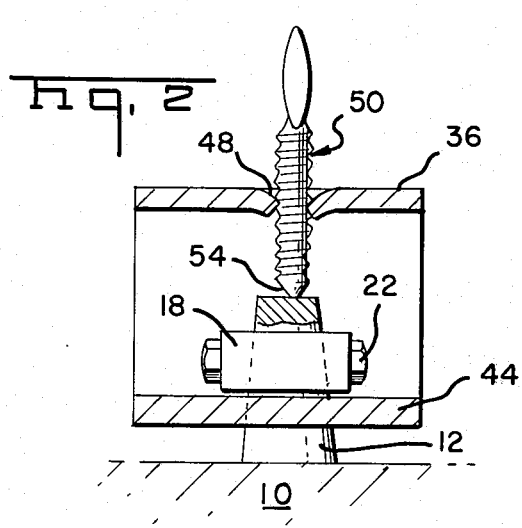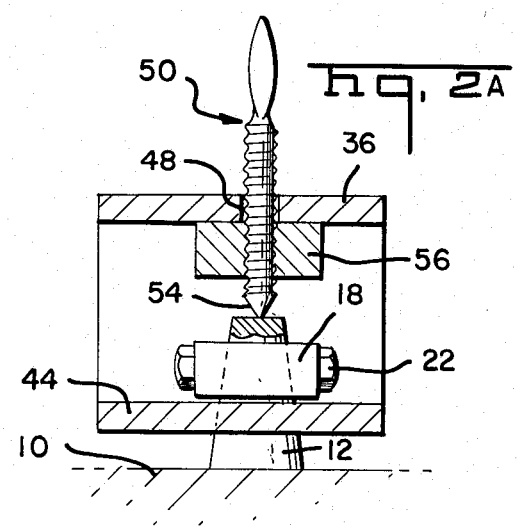
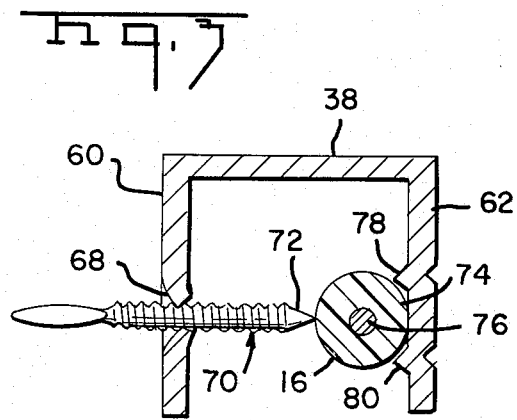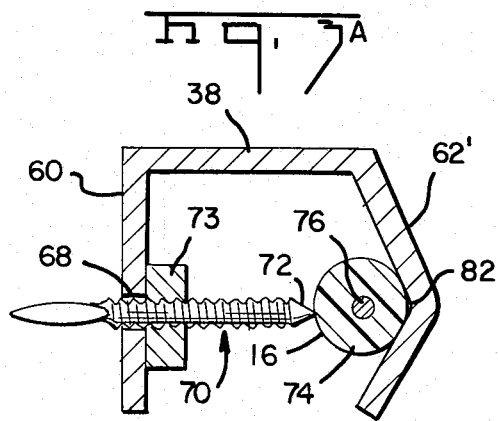

BATTERY TERMINAL DEVICE

DISCLOSURE

This invention relates to a device for completing circuits and more particularly to a device for completing a circuit between a battery post and a battery terminal wire.

In storage batteries of the type which are generally used in vehicles such as automobiles, trucks, and small boats, corrosion tends to occur at the juncture of the positive battery post and battery terminal and the juncture of the terminal and the battery wire.

This can have serious consequences for the vehicle operator since the material generated by the corrosion process acts to insulate these components from each other. The corrosion can be removed by applying a solution of baking soda or other similar material to the corroded parts.

If the corrosion is ignored and permitted to accumulate, it is likely that it will build to such an extent that the output of the battery will be reduced to a degree which is inadequate to power the vehicle.

The present invention relates to a device which is relatively simple to manufacture and which can be carried in the glove compartment of an automobile. Its function is to temporarily complete a circuit between the battery post and the battery wire while bypassing any corrosion therebetween.

The device disclosed is relatively inexpensive, and can be applied to the battery by an unskilled person without the use of any tools.

Generally, the invention relates to a device for completing an electrical circuit between a battery post and a wire coupled to the post by a battery terminal. The device comprises a first member which is electrically conductive and first and second means. The first means electrically couples the first member to the battery post while the second means electrically couples the first member to the conductor in the wire.

For the purpose of illustrating the invention, there are shown in the drawings forms which are presently preferred; it being understood, however, that this invention is not limited to the precise arrangements and instrumentalities shown.

FIG. 1 is a side elevation view showing a presently preferred form of the invention mounted on a battery;

FIG. 2 is a sectional view taken along line 2—2 of FIG. 1;

FIG. 2A is a view similar to FIG. 2 but showing a different form of the invention;

FIG. 3 is a sectional view taken along line 3—3 of FIG. 1; and

FIG. 3A is a view similar to FIG. 3 but showing still a further form of the invention.

Referring to FIG. 1, a battery 10 which may be an automobile battery has two posts 12 extending upwardly therefrom. Only one of the posts is illustrated.

Typically, the battery post is connected to the electrical circuit of an automobile by an insulated battery wire 16. The wire is electrically connected to battery terminal 18 by being received in an opening 20 in a portion of the terminal. The terminal is then secured over the post 12 by a threaded fastener 22.

Corrosion tends to collect at the juncture of post 12 and terminal 18 thereby insulating these two elements from each other. Further, it collects on top of the post and also at the juncture of wire 16 and terminal 18. Thus, over a period of time post 12 will become electrically isolated from wire 16.

The corrosion may be bypassed and an electrical circuit completed between the post 12 and the wire 16 by using the present invention. In FIG. 1, a presently preferred form 30 thereof is illustrated. It comprises a first generally elongated member 32 which includes a first means 36 which may be an elongated arm that is adapted to overlie the post 12 and terminal 18 and a second means 38 which is adapted to overlie the wire 16.

The first means 36 supports a generally "L" shaped member 40 at its distal end. The L-shaped member 40 includes a downwardly depending leg 42 while its base comprises an inwardly directed lip 44 which underlies first means 36.

As seen in FIGS. 1 and 2, the first means 36 includes an aperture 48 which is generally centrally positioned thereon through which a threaded elongated member 50 can extend. Preferably, threaded member 50 can be driven by hand. Thus, it may be any type of screw device such as the thumb screw illustrated with flattened upper portion 52 and a pointed tip 54. The point on tip 54 enables it to be forced through the accumulated corrosion on the top of the battery post to make electrical contact therewith.

Aperture 48 may simply be formed by being punched or drilled in first means 36. The threaded member 50 may be self-tapping so that the expense of providing threads in the aperture can be avoided.

However, it is considered to be within the scope of this invention to provide aperture 48 and threaded member 50 with suitable complementary threads. A satisfactory manner for providing threads at aperture 48 is shown in FIG. 2A where a nut 56 made of electrically conductive material is connected to first means 36 adjacent to and in alignment with aperture 48.

The second means 38 may comprise one of the walls such as the bottom wall of a channel member having side walls 60 and 62 (FIG. 3).

Side walls 60 and 62 are of sufficient width so that they extend past the wire 16 when the device is placed in its operative position so that side wall 62 can support the wire 16.

Side wall 60 includes an aperture 68 which supports an elongated threaded member 70 having a pointed tip 72. The tip can easily pierce the insulation 74 on the wire to contact the connector 76 therein. Both the aperture 68 and the threaded member 70 may be constructed substantially the same as aperture 48 and threaded member 50. Further, a nut 73 (FIG. 3A) may be supported on the side wall 60 in a manner similar to nut 56.

Means may be provided for fixing the location of wire 16 on wall 62 so that the likelihood of its shifting position as it is engaged by threaded member 70 will be substantially reduced.

In FIG. 3, a suitable means is illustrated in the form of a recess defined between two spaced projections 78 and 80 which may be formed by deforming wall 62. In the alternative, these projections can be formed by adding material to wall 62.

An alternative structure which achieves the same result is illustrated in FIG. 3A, wherein wall 62' is generally "V" shaped in cross-section so that the wire is supported at the apex 82 of the "V".

The device may be mounted in operative position on a battery to temporarily bypass the corrosion accumulated at the battery terminal 18. The device is placed over the post 12 and terminal so that lip 44 underlies the terminal 18 and threaded member 52 is in vertical alignment with post 12 so that the terminal and post are between the tip 54 and the lip 44 as best seen in FIGS. 1, 2 and 2A. The wire 16 is positioned between walls 60 and 62 of the second means 38. The elongated threaded members 52 and 70 are then advanced in their respective apertures. Threaded member 50 contacts the top of the battery post 12 while threaded member 52 pierces the insulation 74 on battery wire 16 to make contact with the conductor 76. It should be noted in this regard that each of the elongated threaded members may be a thumb screw or similar device so that they can be advanced to make contact with the battery post and the conductor without the use of any tools.

The flow of electricity which powers the vehicle takes place through a path which comprises the battery post 12, the tip 54 of elongated threaded member 50, that portion of the elongated member 32 which lies between the elongated threaded member 50 and elongated threaded member 70, tip 72 and the conductor 76. It is preferred that the entire device be made of electrically conductive material. However, it should be appreciated that the device could be made from non-conductive material with a suitable current path provided between the tips 54 and 72 of elongated threaded members 50 and 70.

The device disclosed herein is relatively simple in construction and can be readily applied over a battery terminal by an unskilled person without tools. Thus, the substantial inconvenience which would result from corrosion interferring with the flow of electricity between the battery 10 and the vehicle powered thereby can be avoided.

While the invention has been described with regard to certain forms and embodiments thereof, it is apparent that many other forms and embodiments would be obvious to those skilled in the art in view of the foregoing description. Thus, the scope of the invention should not be limited by that description but, rather, only by the scope of the claims appended hereto.

I claim:

1. A device for completing an electrical circuit between a battery post and a wire coupled to the post by a battery terminal while bypassing the battery terminal, comprising an elongated member having a first portion overlying the post and a second portion overlying the wire, means in said first portion for directly contacting said post, means in said second portion for directly contacting the conductor of the wire, said post contacting means and said wire contacting means being electrically connected by said elongated member so as to complete an electrical circuit therebetween.

2. A device as set forth in claim 1 further comprising means in said first portion for engaging the battery terminal to mechanically secure the elongated member thereto.

3. A device as set forth in claim 1 further comprising means in said second portion for supporting the wire in position to be contacted by the wire contacting means.

4. A device for completing an electrical circuit between a battery post and a wire coupled to the post by a battery terminal comprising a first elongated member, an aperture in said first elongated member adjacent one end thereof, a generally "L" shaped member coupled to said first elongated member at said one end with the base of said "L" underlying said first elongated member, the other end of said first elongated member comprising one of the walls of a generally channel shaped member, said channel shaped member having side walls and a bottom wall, an aperture in one of said side walls, second and third elongated members threadingly received in each of said apertures, the ends of said second and third elongated members being engageable with the battery post and the wire respectively and being electrically conductive, and means for electrically interconnecting the conductive ends of said second and third elongated members.

5. A device as defined in claim 4 wherein all of said elongated members are comprised of electrically conductive material so that the circuit is completed thereby.

* * * * *